No. 611,419. Patented Sept. 27, 1898.
W. A. RUSSELL.
WALL, FLOOR, OR CEILING PLATE.
(Application filed Nov. 1, 1897.)
(No Model.)
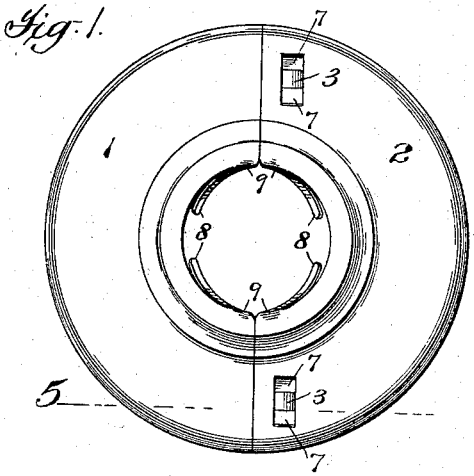
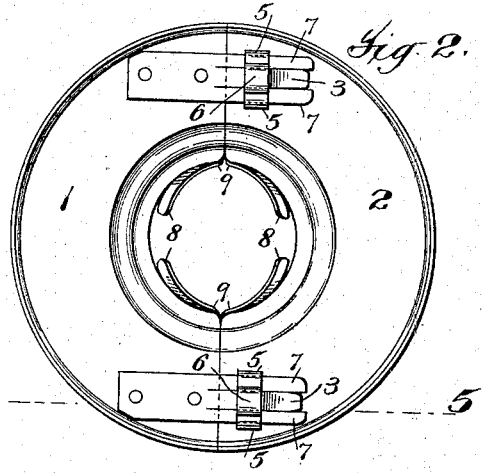
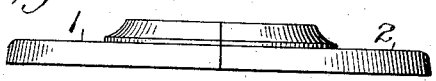
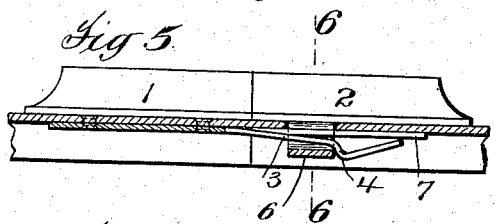
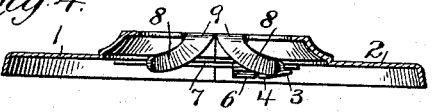
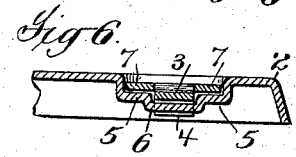
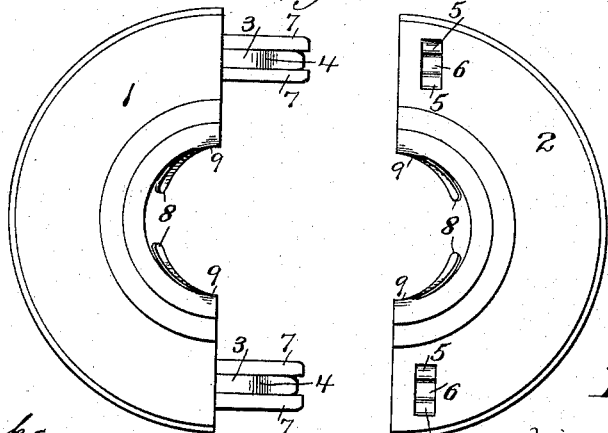
Attest:
A. V. Bourke
Geo H Botts
Inventor
William A Russell
By Philipp Phelps Sawyer
Attys

UNITED STATES PATENT OFFICE.

WILLIAM A. RUSSELL, OF NEW YORK, N. Y.

WALL, FLOOR, OR CEILING PLATE.

SPECIFICATION forming part of Letters Patent No. 611,419, dated September 27, 1898.

Application filed November 1, 1897. Serial No. 657,001. (No model.)

*To all whom it may concern:*

Be it known that I, WILLIAM A. RUSSELL, a citizen of the United States, residing at New York, county of New York, and State of New York, have invented certain new and useful Improvements in Wall, Floor, or Ceiling Plates, fully described and represented in the following specification and the accompanying drawings, forming a part of the same.

My invention relates to wall, floor, or ceiling plates for pipes or the like consisting of separable sections adapted to be brought together to embrace the pipe and provided with locking devices for connecting the meeting ends of the sections when thus brought together. Such plates are sometimes called "canopies," "escutcheons," &c., but for convenience they will be hereinafter referred to as "plates."

It is the object of the present invention to simplify the construction and cheapen the cost of production of such plates and to provide a plate embodying these advantages and the separable sections of which may be readily and quickly brought together into position about the pipe and be locked together securely against separation or displacement in any direction with relation to each other, and which plate will also so engage the pipe or the like as to be held securely against any tendency toward displacement longitudinally of the pipe or the like to which it may be applied.

As a full understanding of the invention can best be given by an illustration and a detailed description of an organization embodying the same, such description will now be given in connection with the accompanying drawings, illustrating the invention in its preferred form, and in which—

Figure 1 is a top plan view, and Fig. 2 a bottom plan view, of a plate embodying the present invention, the two separable sections thereof being brought together and locked. Fig. 3 is a side view of the same. Fig. 4 is a transverse section taken centrally through the two sections when connected together. Fig. 5 is a section, on an enlarged scale, taken on the line 5 of Figs. 1 and 2. Fig. 6 is a section on the line 6 of Fig. 5, and Fig. 7 is a top plan view of the two sections of the plate disconnected and ready to be brought together.

Referring to said drawings, 1 2 represent two semi-annular sections which are counterparts of each other and which when brought together form an annular plate having a contracted neck at one end for embracing a pipe or the like and an enlarged opposite end or base for resting against the wall or the like through which the pipe or the like passes. The two ends or edges of section 1 are each provided on the inner face of said section with a spring-catch 3, adapted to yield endwise of the plate and provided at or near its end with a hook or projection 4, said catches projecting beyond the edges of section 1 into position to be embraced by the corresponding ends of the opposite section 2, and the latter section is provided on its inner face at opposite ends with loops 5, having countersunk central portions 6, adapted to receive said catches 3, the hooks or projections 4 on which catches take in behind said loops as the two sections of the plate are brought together, and thus with said loops form self-locking devices securely uniting or locking the two sections against lateral separation. Each catch 3 also is supplemented with means for retaining the meeting edges of the two sections in accurate registry vertically and for preventing rocking movement of one section on the other, said means consisting, preferably, of a side strip or strips 7, two of which are preferably provided for each catch 3 and which project beyond the edges of section 1, parallel with the catch, into position to be also embraced by the loops 5, so as to engage therewith, and also the inner face of section 2, beyond the loops, as best shown in Figs. 2 and 5. Said strips 7 also serve the function of guiding their respective catches 3 into the loops 5 as the two sections are moved toward each other, the outer corner of each of said strips for this purpose being rounded or beveled, as shown, so that they will readily enter the loops. The faces of the two sections are retained in accurate registry also by the side strips 7, the outer edges of which are adapted to engage with the end walls of the loops 5, as best shown in Fig. 6. For this purpose also the catches 3 and the corresponding countersunk portions 6 of the loops 5 are so formed and of such width relatively to each other that as the hooks or projections 4 of said catches take in behind the loops 5 the side edges of said catches will engage with the end walls of the respective countersunk portions 6 of the loops.

The plate is also provided with means for connecting it to and holding it in position upon the pipe or the like, consisting of a plurality of spring-arms 8, extending endwise of the plate in a spiral direction from the dome or neck of the plate and inwardly therefrom into position to engage at their lower ends the surface of the pipe or the like, said spring-arms 8 being each provided in addition with a shoulder 9 at the neck or dome of the plate, also adapted to bear against the pipe or the like. By reason of this construction and arrangement of the arms 8 each of said arms is provided with a plurality of bearing portions—namely, the shoulder 9 and the end of the arm—adapted to bear against the pipe or the like at two points, longitudinally and transversely thereof.

The two sections 1 2 are preferably formed of sheet-steel stamped to the required shape, the spring-arms 8 being also preferably integral therewith and stamped out and bent to the required shape and position during the formation of the body of the plate or otherwise. The loops 5 also are preferably integral with section 2, being stamped out with their countersunk portions 6 during the formation of said section or otherwise.

To connect the two sections of the plate, all that is necessary to be done is to bring the two ends opposite each other, introduce the ends of the strips 7 into the loops 5, and then press the two sections together until their ends abut, the catches 3, as the two sections are thus brought together, being guided into the loops 5 by the strips 7 and then taking in behind the loops 5, as illustrated in Fig. 5, and the side strips 7 at the same time engaging said loops and the inner face of section 2 in such manner as to retain the faces of the two sections 1 2 in proper registry and also prevent any rocking movement of one section relatively on the other.

What I claim is—

1. A plate of the class described comprising two separable sections and provided with self-locking devices for meeting ends thereof comprising a loop projecting from the face of one section, and means on the other section and projecting beyond the edge thereof into position to enter the loop and engage the face and ends thereof and the face of the loop-carrying section as the two sections are brought together, said locking means including a spring-catch provided with a locking projection adapted to take in behind the loop, substantially as described.

2. A plate of the class described comprising two separable sections and provided with self-locking devices for meeting ends thereof comprising a spring-catch provided with a locking projection on one section and projecting beyond the edge thereof into position to be embraced by the other section, a loop on the latter section and integral therewith adapted to interlock with said locking projection as the two sections are brought together, and a strip carried by said first-named section projecting beyond the edge thereof on one side of the catch into position to interlock with said loop and the inner face of the opposite section, substantially as described.

3. A plate of the class described comprising two separable sections and provided with self-locking devices for meeting ends thereof comprising a spring-catch provided with a locking projection on one section and projecting beyond the edge thereof into position to be embraced by the other section, a loop on the latter section and integral therewith adapted to interlock with said locking projection as the two sections are brought together, and strips carried by said first-named section projecting beyond the edge thereof on opposite sides of the catch into position to interlock with said loop and the inner face of the opposite section, substantially as described.

4. A plate of the class described comprising two separable sections and provided with locking devices for meeting ends thereof and with means for connecting the plate to a pipe or the like consisting of a plurality of spring-arms arranged in pairs and borne by the plate, the spring-arms of each pair extending endwise of the plate and inwardly toward each other in a spiral direction into position to engage the pipe or the like, substantially as described.

5. A plate of the class described comprising two separable sections of sheet metal provided with locking devices for meeting ends thereof, each of said sections being provided with means for connecting the plate to a pipe or the like consisting of a pair of spring-arms integral with the section and extending endwise thereof and inwardly toward each other in a spiral direction into position to engage the pipe or the like, substantially as described.

6. A plate of the class described comprising a section 1, provided with spring-catches 3 having locking projections 4 and strips 7 on the sides of the catches and a section 2 provided with loops 5 adapted to embrace and interlock with said catches 3 and strips 7 as the sections are brought together, substantially as described.

7. A plate of the class described comprising two separable sections of sheet metal provided with locking devices for meeting ends thereof, each of said sections being provided with means for connecting the plate to a pipe or the like consisting of a pair of spring-arms 8 integral with the section and extending endwise thereof toward each other in a spiral direction and into position to embrace the pipe, each of said spring-arms being provided with a shoulder 9 and with a bearing portion beyond said shoulder, substantially as described.

In testimony whereof I have hereunto set my hand in the presence of two subscribing witnesses.

WILLIAM A. RUSSELL.

Witnesses:
J. J. KENNEDY,
T. F. KEHOE.